2 Sheets—Sheet 1.

C. BOLLINGER.

HORSE RAKE.

No. 10,168. Reissued July 25, 1882.

Witnesses.
Robert Everett.
J. A. Rutherford

Inventor.
Cornelius Bollinger.
By James L. Norris.
Atty.

2 Sheets—Sheet 2.

C. BOLLINGER.

HORSE RAKE.

No. 10,168. Reissued July 25, 1882.

Witnesses.

Robert Everett.

J. A. Rutherford

Inventor.

Cornelius Bollinger.

By James L. Norris.

Atty.

UNITED STATES PATENT OFFICE.

CORNELIUS BOLLINGER, OF HARRISBURG, PENNSYLVANIA.

HORSE-RAKE.

SPECIFICATION forming part of Reissued Letters Patent No. 10,168, dated July 25, 1882.

Original No. 237,951, dated February 22, 1881. Application for reissue filed May 19, 1882.

*To all whom it may concern:*

Be it known that I, CORNELIUS BOLLINGER, of the city of Harrisburg, in the county of Dauphin and State of Pennsylvania, have invented new and useful Improvements in Horse-Rakes, of which the following is a specification.

This invention relates to improvements in that class of horse-rakes which are composed of a wheeled frame carrying a rake-head to which the rake-teeth are attached, the rake-head being operated through the medium of a hand-lever for raising the rake-teeth to dump a load of hay gathered by them in traversing the ground.

The objects of my invention are to provide a horse-rake with rake-teeth attached to a rising and falling rake-head, which by a descending movement elevates the teeth and by an ascending movement lowers the teeth into position for raking purposes, and to provide the rake-teeth with a pivotal support located in rear of the rake-head, and on which pivotal support the rake-teeth can be rocked to throw the rake-teeth rearward and upward, after which the tooth support can be elevated to further raise the rake-teeth and lift them over the load, all in such manner that the dumping of the gathered material is effected with ease in a rapid, simple, and efficient manner.

The objects of my invention are effected satisfactorily by the construction of horse-rake illustrated in the accompanying drawings, in which—

Figure 1:
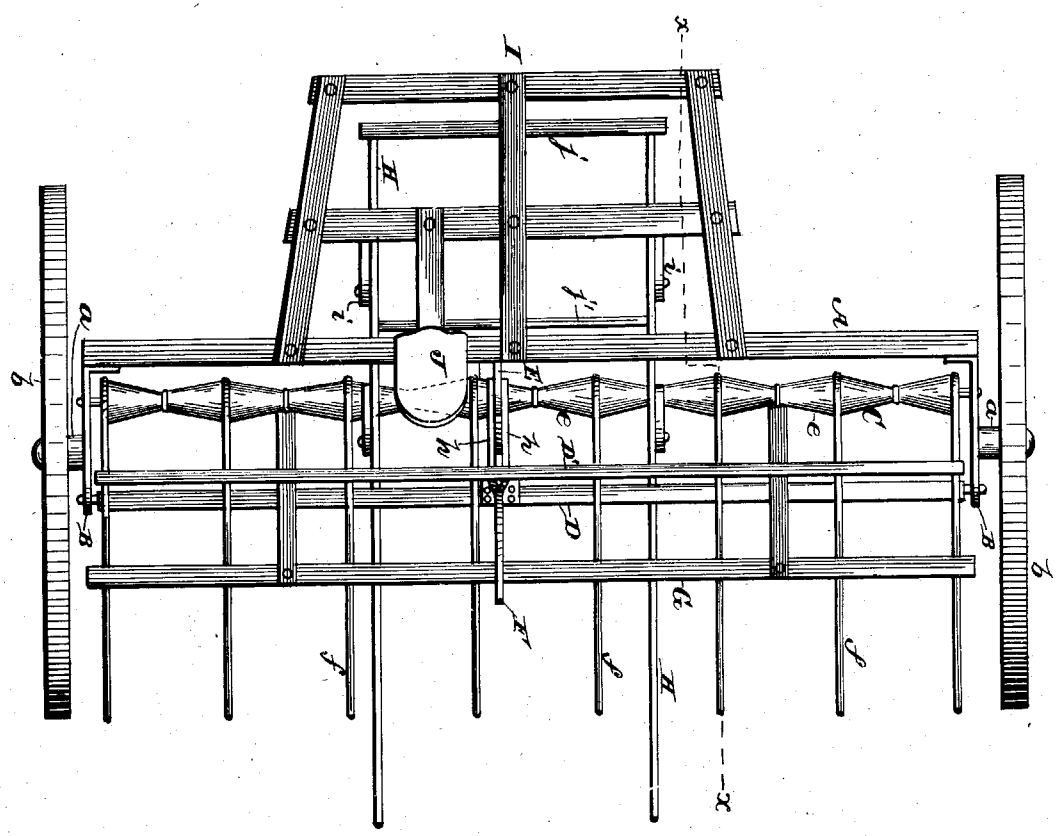
Figure 2:
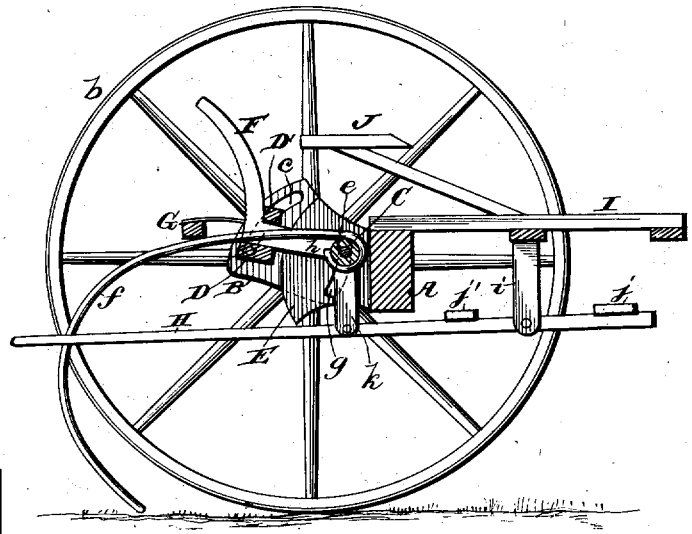
Figure 4:
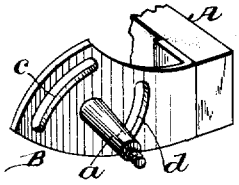
Figure 3:
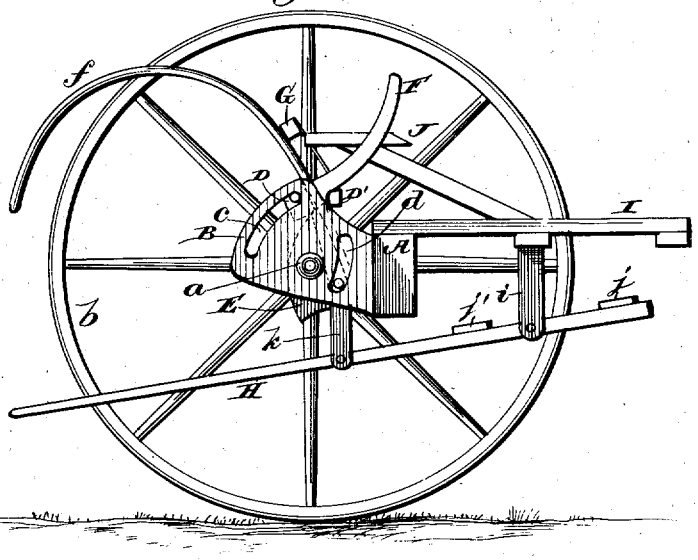
Figure 5:
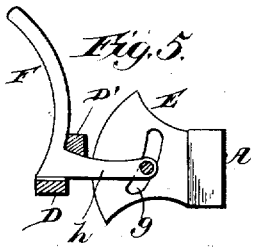

Figure 1 represents a top or plan view of a horse-rake constructed in accordance with my invention. Fig. 2 is a sectional view on the line *x x*, Fig. 1; Fig. 3, a side elevation of Fig. 1, with one wheel removed. Fig. 4 is a detached view of one of the slotted guide plates or castings. Fig. 5 is a detached view illustrating the connection between the rake-head, the rear tooth-support, and hand-lever.

Referring to the drawings, the letter A indicates a horizontal axle, to the ends of which are secured metal plates or castings B, which extend rearward parallel with each other, and are formed with lateral short journals *a*, on which the ground-wheels *b* are arranged to revolve. The plates or castings are each provided with two reversely-arranged upright segmental slots, *c d*, constituting guideways, the former being longer than the latter, and in the slots *d* are arranged the ends of a rake-head, C, consisting of a rod passing through a series of blocks, *e*, around which are secured the ends of the spring rake-teeth *f*, said teeth extending rearward and passing between two parallel horizontal bars, D D′, suitably connected together. The ends of the lower bar, D, have projecting journals arranged in the segmental slots *c* of the plates or castings B, and said bar serves to sustain or support the teeth in rear of the rake-head.

To the center of the bar A is rigidly secured a rearward-projecting plate, E, having a vertically-arranged segmental slot, *g*, through which the rake-head extends, and by which it is also guided in its movement; and to the rake-head, adjacent to this plate, is attached the front end of a horizontal arm, *h*, on a vertical hand-lever, F, said arm being bifurcated to embrace the plate E, and at its rear end secured to the tooth-sustaining bar or support D. The journals on the end of the rear tooth-support, when resting at the lower ends of the guideways formed by the slots *c*, serve as pivots on which the rake-teeth are rocked in a vertical plane when the rake-head is depressed from the upper to the lower ends of its guideways formed by the slots, *d*. This depression of the rake-head by rocking the rear tooth-support causes the points of the rake-teeth to move rearward and upward, and then by elevating the tooth-support in its guideways the rake-teeth are further elevated to lift them over the load. The initial movement of the hand-lever effects the described depression of the rake-head and the consequent rocking of the tooth-support, while a continued forward movement of the hand-lever effects the ascent or elevation of said tooth-support. It will thus be observed that the rake-teeth have two movements imparted to them—first a rearward and partial elevation to commence the discharge of the load of hay, and then a further elevation to lift the teeth over the load.

The teeth, when raking, are held to their work by means of a pressure-bar, G, as usual, and clearers H, of novel arrangement, are provided for forcibly discharging the gathered hay from the rake-teeth when they are elevated to dump a load. These clearers are pivoted near their forward ends to depending bars or studs *i*, secured to the platform or frame I, which projects forward from the bar A, the extreme front ends of the clearers being connected by a cross-piece or treadle, *j*, for the driver's feet. At a point beneath the rake-head the clearers are connected therewith by vertical plates or links *k*. The object of this arrangement is to cause the rake-head to quickly ascend, and thereby lower the rake-teeth when the latter have been raised to dump the load, and this is effected by the driver pressing on the cross-piece or treadle *j*, which, through the fulcrum afforded by the forward pivots of the clearers, causes said clearers to rise at the rear and through the connecting-links *k* force the rake-head upward. The clearers H are connected in rear of the bars or studs by a cross-piece or treadle, *j'*, the object of which is to enable the driver to throw the clearers downward to cause their points to clear the teeth, and at the same time, by means of the links *k*, to cause the rake-head to descend, and thereby elevate the rake-teeth.

The devices described place the machine under perfect control of the driver, and he is enabled to operate the rake-head by power applied through the medium of his feet, or by power applied through the medium of his hand, or by both combined, all with ease and convenience and without the exercise of any considerable strength.

A seat, J, supported by the platform or frame I, is provided for the driver, and it is so located as to place the lever F within his convenient reach.

The plates or castings B supporting the ground-wheels serve, through the medium of their segmental slots to accurately guide both the rake-head and the rear tooth-sustaining bar or support, D, in their rising and falling movements, and as this bar or support is journaled in rear of the rising or falling rake-head it will be evident that the rake-teeth are free to be rocked on their journaled support to throw the points of the teeth rearward and upward, and then said support elevated to lift the teeth over the load, which provides efficient means for discharging or dumping the gathered material in a rapid and effective manner.

By arranging and supporting the rake-teeth in the manner described the teeth and head are evenly balanced, and hence can be operated to discharge a load with considerable ease and convenience.

The rake-teeth are of spring metal and curved rearward and downward, as usual in horse-rakes, which provides for the effective discharge of the load.

What I claim is—

1. The combination of an ascending and descending rake-head, rake-teeth, a rear tooth-support arranged in supporting-guideways in which it is adapted to rock and rise and fall, and means for operating the rake-head to cause the rear tooth-support to first rock in its bearings to throw the points of the teeth rearward and upward and then ascend to lift the teeth.

2. The combination of the axle, the plates or castings provided with the short journals for the ground-wheels and with guideways, the rake-head and rear tooth-support, and means for causing the rake-head and tooth-support to ascend and descend in said guideways, substantially as described.

3. The combination of the axle, the plates or casting provided with guideways, the rake-head and rear tooth-support, and means for causing the rake-head and tooth-support to ascend and descend in said guideways, substantially as described.

In testimony whereof I have hereunto set my hand in the presence of two witnesses.

CORNELIUS BOLLINGER.

Witnesses:
JOEL K. BOLLINGER,
WM. WOLF.